United States Patent [19]
Ito

[11] Patent Number: 5,302,650
[45] Date of Patent: Apr. 12, 1994

[54] VINYL CHLORIDE RESIN COMPOSITION

[75] Inventor: Toshio Ito, Tokyo, Japan

[73] Assignee: Riken Vinyl Industry Co., Ltd., Tokyo, Japan

[21] Appl. No.: 999,468

[22] Filed: Dec. 29, 1992

Related U.S. Application Data

[63] Continuation of Ser. No. 737,659, Jul. 30, 1991, abandoned.

[30] Foreign Application Priority Data

Aug. 6, 1990 [JP] Japan .................................. 2-206793

[51] Int. Cl.$^5$ .......................... C08K 5/12; C08L 27/06; C08L 67/02
[52] U.S. Cl. ..................................... 524/298; 524/311; 524/321; 525/165; 525/169; 525/173
[58] Field of Search ....................... 524/311, 321, 298; 525/169, 165, 173

[56] References Cited
U.S. PATENT DOCUMENTS

| | | | |
|---|---|---|---|
| Re. 28,982 | 9/1976 | Crawford et al. | 525/173 |
| 3,639,329 | 2/1972 | Thompson | 524/298 |
| 3,700,624 | 10/1972 | Adachi et al. | |
| 3,718,715 | 2/1973 | Crawford et al. | 525/173 |
| 3,832,314 | 8/1974 | Hoh et al. | 525/165 |
| 3,856,885 | 12/1974 | Furuya et al. | |
| 4,247,427 | 1/1981 | Edinger | 524/298 |
| 4,739,012 | 4/1988 | Hagman | 525/173 |

Primary Examiner—Paul R. Michl
Assistant Examiner—Andrew E. C. Merriam
Attorney, Agent, or Firm—Oblon, Spivak, McClelland, Maier & Neustadt

[57] ABSTRACT

A vinyl chloride resin composition comprises: a mixture composed of 10 to 97 wt % vinyl chloride resin and 3 to 90 wt % thermoplastic polyester elastomer; and 10 to 200 parts by weight of a plasticizer with respect to 100 parts by weight of said mixture, the molecular weight of said plasticizer being 500 to 5000. This vinyl chloride resin composition can be easily melt bonded to polycarbonate resins which conventionally cannot be readily melt bonded. Therefore, the composition can be widely used in extrusion molding and injection molding. Furthermore, as a high molecular weight plasticizer is employed as the plasticizing agent, the problem of cracks can be overcome. In addition, since the necessity of using the adhesive agent in the manufacturing process can be eliminated, the overall cost can be significantly reduced.

5 Claims, No Drawings

VINYL CHLORIDE RESIN COMPOSITION

This application is a continuation of application Ser. No. 07/737,659, filed on Jul. 30, 1991, now abandoned.

BACKGROUND OF THE INVENTION

1. Field of the Invention

The present invention relates to a vinyl chloride resin composition, and, more particularly, to a vinyl chloride composition having an improved ability to melt bond to a polycarbonate resin.

2. Discussion of the Background

Since vinyl chloride resins are inexpensive, have excellent physical and chemical properties and satisfactory workability, it is widely used in, for example, manufacturing films and molding products. However, a variety of improvements in the characteristics of these resins have been desired because they are used in many fields for a variety of purposes and formed in a variety of manners. In order to achieve these improvements, blending of resins have usually been employed. For example, methods have been disclosed in Japanese Patent Laid-Open Nos. 50-36454 and 51-48169 and U.S. Pat. Reissue No. 28,982 among which elastic polyesters are blended in in order to improve the impact resistance and abrasion resistance of the vinyl chloride resin.

On the other hand, although co-extrusion molding, insert extrusion molding, co-injection molding and insert injection molding are available for improving the characteristics by combining, for example, a plurality of resins, affinity is required in such cases, between the resins to be combined in order to prepare a combined material having satisfactory characteristics.

However, in cases where a laminated film or sheet composed of a vinyl chloride resin and another resin is manufactured by such molding methods, there are very few types of resins which can be melt bonded to the vinyl chloride resin. Only resins having compatibility with respect to the vinyl chloride resin, for example, styrene-acrylonitrile-butadiene copolymer resins (ABS resins) or polymethyl methacrylate resins (PMMA resins) can be employed.

In a case where a laminated film or a sheet composed of vinyl chloride and polycarbonate resin which has no compatibility with respect to the vinyl chloride resin is manufactured, an adhesive agent must be used in the extrusion or the injection process because the above-described elements cannot be melt bonded together. In this case, there arises a problem in that the adhesive agent employed will raise the overall cost. Furthermore, there is also a problem with cracks generated in the polycarbonate resin if a vinyl chloride resin, with which a conventional plasticizer, for example dioctyl phthalate, is blended and then melt bonded with the polycarbonate resin.

An object of the present invention is to overcome the above-described problems. That is, an object of the present invention is to provide a vinyl chloride resin composition which can be melt bonded to a polycarbonate resin.

SUMMARY OF THE INVENTION

The inventor of the present invention discovered a vinyl chloride resin composition capable of overcoming the above-described problems as a result of earnest research.

That is, according to one aspect of the present invention, there is provided a vinyl chloride resin composition comprising: a mixture composed of 10 to 97 wt % vinyl chloride resin and 3 to 90 wt % thermoplastic polyester elastomer; and 10 to 200 parts by weight of a plasticizer with respect to 100 parts by weight of said mixture, the molecular weight of said plasticizer being 500 to 5000.

DETAILED DESCRIPTION OF THE INVENTION

The present invention will now be further described.

Vinyl chloride resins which can be employed in the present invention are homopolymers of vinyl chloride, copolymers of vinyl chloride and another monomer, graft polymers of vinyl chloride and another monomer, and chlorinated compounds of their homopolymers, copolymers or graft polymers having an average polymerization degree of 400 to 4000. A preferred polymerization degree is 500 to 3000, more preferably 700 to 2000. If the average polymerization degree is less than 400, the strength of the resin composition deteriorates and if it is greater than 4000, the processability deteriorates. The vinyl chloride resin may be used in amounts of 10 to 97 wt % with respect to a mixture of the vinyl chloride resin and a thermoplastic polyester elastomer, preferably 40 to 95 wt % and more preferably 70 to 90 wt %. If it is less than 10 wt %, the flame resistance possessed by the vinyl chloride resin will be lost and the adjustment of the hardness by using a plasticizer cannot easily be performed. If it is greater than 97 wt %, the ability to melt bond to the polycarbonate resin deteriorates.

The thermoplastic polyester elastomer according to the present invention is an (AB)n-type multiblock copolymer, that is, a segmented copolyester with a molecular weight of 5000 to 100,000 and which is composed of terephthalic acid type crystalline polyester hard segment (PBT material) expressed by the following general formula:

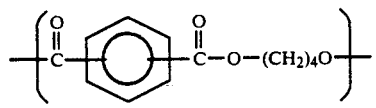

and an aliphatic polyether soft segment (PTMG, PPG and PEG material), the molecular weight of which is 600 to 6000, preferably 600 to 3000 and which is expressed by the following formula:

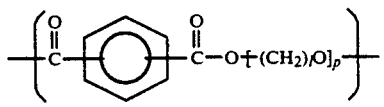

(where l is an integer from 2 to 4 and p is an integer from 8 to 140)

If the molecular weight of the segmented copolyester is less than 5000, the properties of the resin composition, for example the tensile strength and the low temperature resistance, deteriorates and if it is greater than 100,000 the processability deteriorates. The thermoplastic polyester elastomer may be blended by 3 to 90 wt % of the mixture composed of the vinyl chloride resin and the thermoplastic polyester elastomer, and more preferably 10 to 30 wt %. If it is less than 3 wt %, the ability to melt bond to the polycarbonate resin deteriorates. If the same is greater than 90 wt %, the flame resistance will be lost and the adjustment of the hardness by using a plasticizer cannot be easily performed.

The plasticizer according to the invention is not particularly limited if it has a molecular weight of 500 to 5000, preferably 500 to 4000 and more preferably 500 to 3000. For example, a plasticizer usually used when vinyl chloride resins are prepared may be employed. The plasticizer is exemplified by phthalic acid type esters such as di-tridecyl phthalate, trimellitic acid type esters such as trioctyl trimellitate, pyromellitic acid type esters such as pyromellitic acid tetra 2-ethyl hexyl and adipic acid type esters which are a condensation product of an adipic acid and a diol such as 1,2-propylene glycol, triethylene glycol, neopentyl glycol or the like. It is preferable that the adipic acid type polyester be selected from the above-described plasticizers. If the molecular weight thereof is less than 500, the plasticizer migrates to the polycarbonate resin, causing the ability to melt bond to the polycarbonate resin to be deteriorated. Furthermore, cracks are generated in the polycarbonate resin. On the contrary, if the molecular weight is greater than 5000, the processability of the composition deteriorates. It is preferable that the platisticizer be added in amounts from 10 to 200 parts by weight with respect to 100 parts by weight of the mixture composed of the vinyl chloride resin and the thermoplastic polyester elastomer and more preferably 15 to 150 parts by weight. If it is less than 10 parts by weight, the hardness becomes excessively high, causing the touch and the flexibility of the composition to be lost. On the contrary, if it is higher than 200 parts by weight, bleeding or the like takes place, causing deterioration in the ability to melt bond to the polycarbonate.

When the thus-blended composition is prepared, an ordinary compounding agent to be added to the vinyl chloride resin may be employed, the compounding agent being exemplified by: organic tin type stabilizing agents such as dialkyl tin mercaptide, dialkyl tin maleate, dialkyl tin laurate; metallic soap such as calcium stearate, zinc stearate, cadmium stearate, barium stearate and lead stearate; inorganic stabilizing agents such as tribasic lead sulfate, dibasic lead stearate, calcium hydroxide and calcium silicate; chelating agents such as tris(nonylphenyl)phosphite and alkyl monoaryl phosphite; waxes such as ester type wax and hydrocarbon type wax; epoxy compounds such as epoxidized soy bean oil, epoxidized linseed oil and bisphenol A diglycidyl ether; and fillers such as calcium carbonate, talc, clay and mica. Furthermore, pigments or antistatic additives may be added if necessary.

The vinyl chloride resin composition according to the present invention can be melt bonded to the polycarbonate resin by properly setting the type, the molecular weight and the mixture quantity of the polyether of the soft segment of the thermoplastic polyester elastomer.

EXAMPLES

Methods for achieving the present invention are illustrated with reference to the following examples, but the invention is not intended to be limited thereby.

Example 1

A vinyl chloride resin composition was prepared by adding 40 parts by weight of a thermoplastic polyester elastomer (Hytrel 4056 manufactured by E.I. du Pont de Nemours and Co.), 60 parts by weight of adipic acid type plasticizer (PN-280 manufactured by Adeka Argus Chemical Co. and having a molecular weight of 2000) and 4 parts by weight of a Ba-Zn type stabilizing agent (mixture AC-212/RUP-14 manufactured by Adeka Argus Chemical Co.) to 100 parts by weight of polyvinyl chloride (homopolymer of vinyl chloride TK-1000 manufactured by Shin-etsu Chemical Co.) the average polymerization degree of which was 1000.

Then, the composition thus-prepared was kneaded in a roll set at 150° C. for 5 minutes to obtain a vinyl chloride resin sheet. The sheet thus-formed and a polycarbonate sheet (Iupilon S-3000 manufactured by Mitsubishi Gas Chemical Co.) were laminated to each other. Then, they were heated in a press set at 180° C., under pressure for 4 minutes so that a combined molded sheet was obtained.

The vinyl chloride resin sheet thus-obtained was subjected to the following tensile strength and low temperature resistance tests. The combined molded sheet was subjected to a 180-degree peeling test and a shear peeling test.

(a) Tensile test

The tensile properties were evaluated in accordance with JIS K6723.

(b) Low temperature resistance

The low temperature resistance was evaluated in accordance with JIS K6723.

(c) 180-degree peeling test 180-degree peeling test was carried out in accordance with JIS K6854.

(d) Shear peeling test

The shear peeling test was carried out in accordance with JIS K6850.

The physical properties obtained in the abovedescribed tests are shown in Table 1.

Example 2

A vinyl chloride resin composition and a molded sheet were manufactured in the same manner as in Example 1 except that the polyvinyl chloride having an average polymerization degree of 1000 used in Example 1 was replaced by an ethylenevinyl chloride copolymer (E-1050 manufactured by Tosoh Corporation) the average polymerization degree of which was 1000. They were subjected to the above-described physical property tests (a) to (d) and the physical properties obtained in the above-described tests are shown in Table 1.

Example 3

A vinyl chloride resin composition and a molded sheet were manufactured in the same manner as in Example 1 except that the quantity of the added thermoplastic polyester elastomer according to Example 1 was changed to 20 parts by weight. They were subjected to the above-described physical property tests (a) to (d) and the physical properties obtained in the above-described tests are shown in Table 1.

Example 4

A vinyl chloride resin composition and a molded sheet were manufactured in the same manner as Example 1 except that the adipic acid type polyester plasticizer according to Example 1 was replaced by a trimellitic acid type plasticizer (W-700 manufactured by Dainippon Ink and Chemicals Co. and having a molecular weight of 546). They were subjected to the above-described physical property tests (a) to (d) and the physical properties obtained in the above-described tests are shown in Table 1.

Example 5

A vinyl chloride resin composition and a molded sheet were manufactured in the same manner as in Example 1 except that the thermoplastic polyester elastomer according to Example 1 was replaced by Pelprene (P-40H manufactured by Toyobo Co.). They were subjected to the above-described physical property tests (a) to (d) and the physical properties obtained in the above described tests are shown in Table 1.

Comparative Example 1

A vinyl chloride resin composition and a molded plate were manufactured in the same manner as Example 1 except that the quantity of added thermoplastic polyester elastomer according to Example 1 was changed to 0 parts by weight. They were subjected to the above-described physical property tests (a) to (d) and the physical properties obtained in the above-described tests are shown in Table 1.

Comparative Example 2

A vinyl chloride resin composition and a molded sheet were manufactured in the same manner as Example 1 except that the adipic acid type polyester plasticizer according to Example 1 was replaced by a phthalic acid type plasticizer (di-2-ethyl hexyl phthalate manufactured by Kyowa Hakko Kogyo Co. the molecular weight of which was 390). They were subjected to the above-described physical property tests (a) to (d) and the physical properties obtained in the above-described tests are shown in Table 1.

Furthermore, as a high molecular weight plasticizer is employed as the plasticizing agent according to the present invention, the problem of cracks can be overcome.

In addition, since the necessity of using an adhesive agent in the manufacturing process can be eliminated, the overall cost can be significantly reduced.

What is claimed is:

1. A vinyl chloride resin composition comprising:
   a mixture composed of 10 to 97 wt % vinyl chloride resin and 3 to 90 wt % segmented copolyester the molecular weight of which is 5000 to 100,000 and which is composed of a terephthalic acid crystalline polyester hard segment expressed by the following formula:

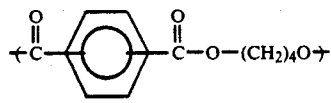

and an aliphatic polyether soft segment the molecular weight of which is 600 to 6000 and which is expressed by the following formula:

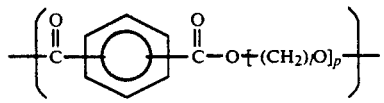

where l is an integer from 2 to 4 and p is integer from 8 to 140; and
   10 to 200 parts by weight of an organic acid ester plasticizer selected from the group consisting of trimellitic acid esters, pyromellitic acid esters and adipic acid polyesters
   with respect to 100 parts by weight of said mixture, the molecular weight of said plasticizer being 500

TABLE 1

| | 180-degree Peeling Strength (Kgf/25 mm) | Shear Peeling Strength (Kgf/cm$^2$) | Tensile Properties | | Low Temperature Resistance (Brittleness Temperature) (°C.) |
|---|---|---|---|---|---|
| | | | Strength (Kgf/mm$^2$) | Elongation (%) | |
| Example 1 | 39.5 (material broken) | 46.4 (material broken) | 1.62 | 360 | −33 |
| Example 2 | 35.0 (material broken) | 43.2 (material broken) | 1.50 | 360 | −30 |
| Example 3 | 17.0 | 36.0 (material broken) | 1.45 | 330 | −20 |
| Example 4 | 34.5 (material broken) | 42.4 (material broken) | 1.40 | 350 | −33 |
| Example 5 | 38.0 (material broken) | 45.6 (material broken) | 1.55 | 355 | −32 |
| Comparative Example 1 | 0 | 0 | 1.60 | 250 | −10 |
| Comparative Example 2 | 0 | 0 | 1.50 | 380 | −40 |

As can be understood from Table 1, the vinyl chloride resin composition according to the present invention exhibits improved tensile strength and low temperature resistance in comparison to the conventional vinyl chloride resin composition. Furthermore, it can be melt bonded to a polycarbonate resin while exhibiting satisfactory 180-degree peeling strength and shear peeling strength.

The vinyl chloride resin composition according to the present invention can be easily melt bonded to polycarbonate resins to which conventional resins cannot be readily melt bonded. Therefore, the composition can be widely used in extrusion molding and injection molding.

to 5000.

2. A vinyl chloride resin composition according to claim 1 wherein the average polymerization degree of said vinyl chloride resin is 400 to 4000.

3. A vinyl chloride resin composition according to claim 1 wherein the average polymerization degree of said vinyl chloride resin is 500 to 3000.

4. A vinyl chloride resin composition according to claim 8 wherein the average polymerization degree of said vinyl chloride resin is 700 to 2000.

5. A vinyl chloride resin composition according to claim 1 wherein the molecular weight of said plasticizer is 500 to 4000.

* * * * *